June 9, 1942.   F. GUTZMANN   2,285,432
CONDENSER
Filed May 25, 1939

Inventor:
Fritz Gutzmann
by E. D. Phinney
Att'y

Patented June 9, 1942

2,285,432

UNITED STATES PATENT OFFICE 2,285,432

CONDENSER

Fritz Gutzmann, Schoneiche, near Berlin, Germany, assignor to C. Lorenz Aktiengesellschaft, Berlin-Tempelhof, Germany, a company Application May 25, 1939, Serial No. 275,666
In Germany February 12, 1938

1 Claim. (Cl. 175—41.5)

Variable condensers with ceramic material as dielectric are known, in which the halves of the condenser are applied to the outer surfaces of ceramic plates ground onto each other, that there is only ceramic material between the condenser coatings. Difficulties arise with these condensers owing to the rotary mounting of the ceramic bodies carrying the plates, because the axes of the bearings must be exactly as possible perpendicular to the plane of the surfaces grinding on each other. If, for example, stub axles of ceramic material are used, by constructing them as part of the insulating bodies of the condensers, then it is practically impossible to achieve a truly axial position of these axles. Equally, a common axle cannot be used for both plates, as when high operative voltages are used flash-overs over the common axle occur very easily.

The present invention therefore proposes to provide an axial support for but one of the condenser plates, while the other plate is suspended in a flexible manner and is pressed on the second condenser plate by spring pressure or the like.

Figure 1:
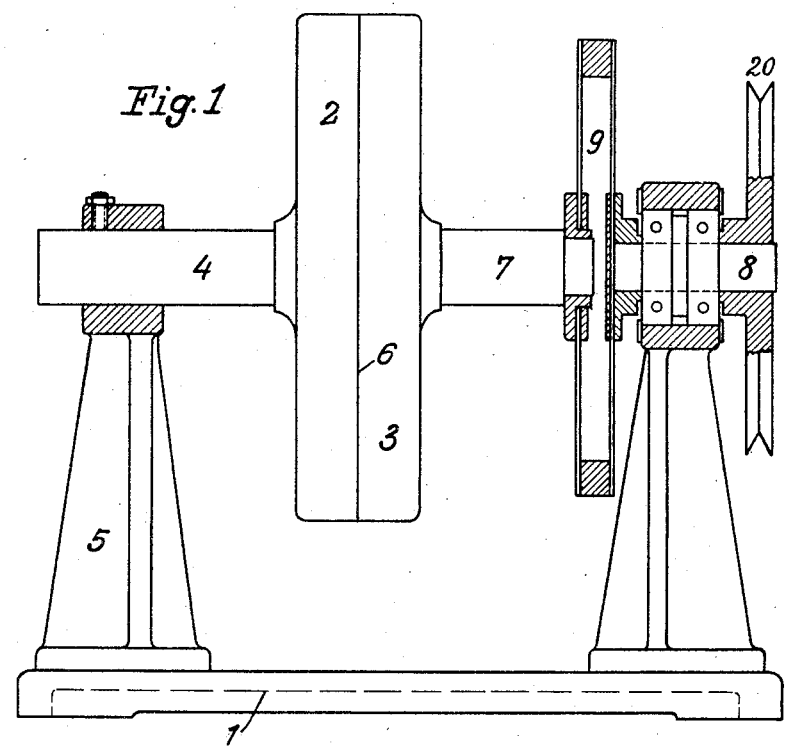

The attached drawing shows by way of example two embodiments of the invention. Fig. 1 is a partially sectioned elevation representing one of these embodiments, while Fig. 2 is a partially sectioned elevation of the other embodiment.

In the arrangement according to Fig. 1, two plates of a variable condenser are arranged on a common carrier 1. The plate 2 has a stub axle 4, which is rigidly connected with the bearing pedestal 5. The rotary plate 3 rests with its ground surface 6 against plate 2 and is provided with a stub axle 7, which is in flexible or yielding connection with driving axle 8. Such flexible suspension of the condenser plate 3 is effected for example over a cross-spring arrangement 9, which exerts a continuously axial force on the condenser portion it carries. The drive is effected over a pulley 20.

Figure 2:
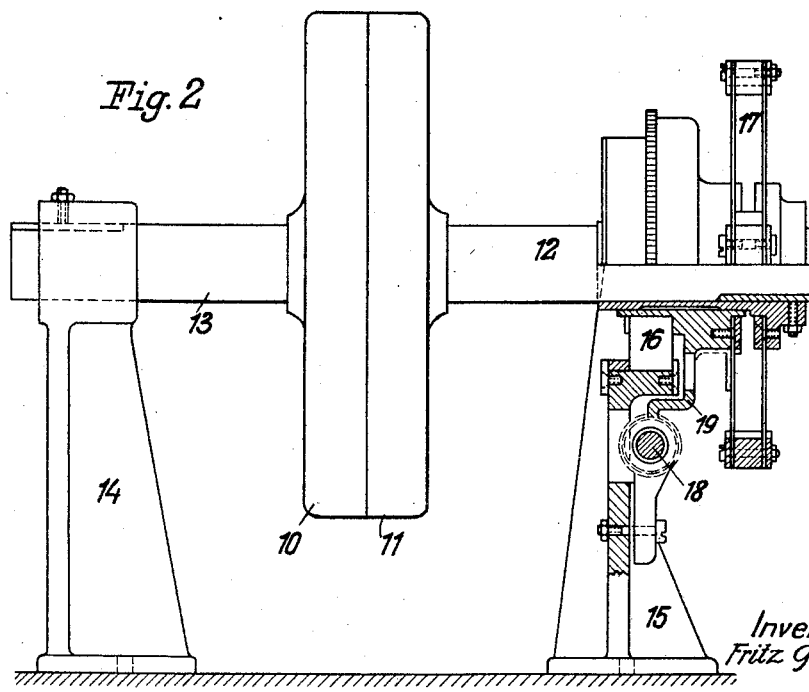

The second plate can alternatively be suspended in a swing or self-aligning ball bearing, as shown in Fig. 2, so that the spring coupling, adapted to yield in all directions can be replaced by a device of purely axial resiliency.

In Fig. 2 as in Fig. 1 two insulating members 10 and 11, acting as plates and formed with stub axles 12 and 13 are carried in bearing pedestals 14 and 15. The stub axle 13 is firmly connected with its carrier 14, while the movable stub axle is located in a swing ball-bearing 16. The axial force for the compression of the surfaces ground together is generated by a spring device 17. The drive is effected over a worm 18, which is mounted in the bearing pedestal 15 and arranged to act on a cogwheel 19.

The fixed plate can in a similar manner be flexibly mounted and the rotary plate be rigidly supported.

What is claimed is:

A condenser comprising two ceramic plates ground to each other and each having a substantially plane surface, a first axle rigidly mounted and supporting one of said plates, a rotatable second axle supporting the other of said plates, and a mounting for said second axle comprising spring means for pressing the plane surfaces of said plates together and self-aligning ball bearing means for allowing angular adjustment of the axis of said second axle with respect to the plane of the surface of the plate mounted on said first axle.

FRITZ GUTZMANN.